US006842715B1

United States Patent
Gaal

(10) Patent No.: US 6,842,715 B1
(45) Date of Patent: Jan. 11, 2005

(54) MULTIPLE MEASUREMENTS PER POSITION FIX IMPROVEMENTS

(75) Inventor: Peter Gaal, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 10/624,367

(22) Filed: Jul. 21, 2003

(51) Int. Cl.[7] .............................................. G01C 17/00
(52) U.S. Cl. .................................. 702/152; 342/357.12
(58) Field of Search ..................... 702/152; 342/357.12, 342/357.02

(56) References Cited

U.S. PATENT DOCUMENTS

| 4,578,678 A | * | 3/1986 | Hurd ..................... 342/357.12 |
| 6,429,808 B1 | * | 8/2002 | King et al. ............ 342/357.02 |

* cited by examiner

*Primary Examiner*—Xiuqin Sun
(74) *Attorney, Agent, or Firm*—Philip Wadsworth; Charles D. Brown; Donald C. Kordich

(57) ABSTRACT

Methods and apparatuses for improved position determination of a device using multiple pseudo range measurements from transmitting sources at known locations, such as GPS satellites. A plurality of pseudo range measurements for each transmitting source are processed together to obtain a simplified maximum likelihood estimate for the pseudo range for that transmitting source at a common reference time. The processed pseudo range estimates for all transmitting sources are then combined using conventional position determination algorithms. This technique facilitates removal of raw measurement outliers prior to position determination, which results in improved (i.e., more accurate) position fixes of the device. In addition, improved measurement integrity monitoring of the pseudo range measurements is a feature of this invention.

28 Claims, 6 Drawing Sheets

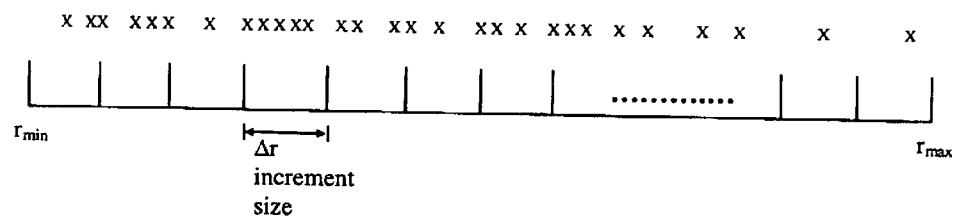
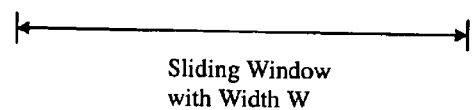
X represents pseudo range measurements
Fig. 3

Single point measurement results

Five point position averaging

Ten point position averaging

Five point pseudo range averaging

Ten point pseudo range averaging

MULTIPLE MEASUREMENTS PER POSITION FIX IMPROVEMENTS

BACKGROUND OF THE INVENTION

Field of the Invention

The field of the present invention relates generally to determining the location of a device. More particularly, the invention relates to methods and apparatus for providing an improved (i.e., more accurate) estimate of the location of the device based on processing pseudo range values from transmitting sources, particularly GPS satellites.

BACKGROUND OF THE INVENTION

The desire to determine accurately the location of wireless devices is being driven in part by regulatory forces. In June 1996, the Federal Communications Commission (FCC) mandated support for enhanced 911 (E-911) service with planned phased implementations by the first decade of the 21st century.

A common method of locating a device is to determine the amount of time it takes for signals transmitted by known sources to reach the receiver of the device to be located. One such source of transmitted signals is known as the Global Positioning Satellite (GPS) system as shown in FIG. 1. The GPS system relies on a constellation of 24 satellites (plus other spare satellites) circling the earth every 12 hours at an altitude of 20,200 km. Each GPS satellite transmits a unique message which identifies its position at a particular time. In addition, each GPS satellite transmits unique binary ranging codes which allow the GPS receiver to discriminate the various satellites in view and to obtain the apparent range ("pseudo range") between each satellite and the receiver. Multiple GPS signals at any particular time can serve as reference points to determine the location of a device. By measuring the distance from at least four GPS satellites, the GPS receiver within a device can triangulate its position anywhere on the earth. The device's location is calculated by measuring the time required for the GPS signals to travel from the GPS satellites to the device. Typically, four pseudo range measurements from four GPS satellites are sufficient to determine the location of the device. Additional pseudo range measurements may be needed depending on the GPS receiver's time alignment accuracy. Each pseudo range measurement contains partial position information for calculating the device location.

One conventional method estimates a position for a particular time using M pseudo range values determined from M GPS satellites at that particular time. For a stationary device, this estimation is repeated at N sequential time intervals to derive N position estimates over the N time intervals. The N position estimates are then processed to determine the estimated position fix of a device. The processing technique can incorporate Kalman filtering, maximum likelihood estimation, weighted averaging, unweighted averaging, and variations of the above-mentioned processing techniques known to one skilled in the art. However, since each of these processing techniques uses computed position estimates to determine a filtered position, there is an inherent difficulty with outlier removal which can result in a less accurate (i.e., more erroneous) position determination estimate. It would be easier to filter out outliers if pseudo range values were processed directly prior to position determination since in the "raw" pseudo range format, outliers are more apparent. An outlier is an aberrant measurement which is statistically inconsistent with other measurements. For example, the GPS receiver is susceptible to occasional measurement outliers.

In addition, when position estimates are processed to determine position, accurate signals from at least four GPS satellites are needed to fully determine position. In the event there are more than at least four in-view GPS satellites (i.e., the measurement is over-determined), then measurement integrity monitoring can be performed. Measurement integrity monitoring is the process of ensuring the validity of a set of GPS measurements, which may be achieved by checking the validity of each particular range measurement (taking measurement values in turns) against the position computed based on the remainder of the measurements (i.e., the set excluding the chosen measurement). However, if there are not enough GPS measurements to give an over-determined solution of position determination, then measurement integrity monitoring cannot be performed easily to determine which measurement is inaccurate.

Accordingly, it would be desirable to provide methods and apparatus for providing device position determination with improved outlier removal. Additionally, it would be desirable to perform some form of measurement integrity monitoring even in the event when the GPS measurements do not give an over-determined solution of position determination. The methods and apparatus disclosed herein satisfy these needs.

SUMMARY OF THE INVENTION

The present invention provides an improved (i.e., more accurate) estimate of the location of the device based on processing pseudo range values from transmitting sources at known locations.

According to one aspect of the invention, the method includes the following steps: receive a plurality of pseudo range measurements from a transmitting source; adjust each of the plurality of pseudo range measurements for time correction and then arrange each of the plurality of pseudo range measurements in order of smallest value to largest value to form a pseudo range interval with the smallest value and the largest value as endpoints; divide the pseudo range interval into a plurality of increments with a plurality of grid points; align a sliding pseudo range window with a grid point and count the number of pseudo range measurements within that sliding pseudo range window. Repeat for each of the other grid points within the pseudo range interval and select a best window based on the maximal number of pseudo range measurements within a sliding pseudo range window. Compare that maximal number with an incidence threshold. Based on the comparison, determine an average pseudo range value. In a preferred embodiment, assign an average SNR and an average RMSE (root-mean-square error) estimate to the average pseudo range value.

In another aspect of the invention, the method includes the following steps: receive a plurality of pseudo range measurements from a transmitting source; adjust each of the plurality of pseudo range measurements for time correction and then arrange each of the plurality of pseudo range measurements in order of smallest value to largest value to form a pseudo range interval with the smallest value and the largest value as endpoints. Divide the pseudo range interval into a plurality of increments having a plurality of grid points; align a sliding pseudo range window with the first grid point, count the number of pseudo range measurements within the sliding pseudo range window and repeat for each of the other grid points within the pseudo range interval.

Select a plurality of best windows based on at least one predetermined criterion and determine a plurality of average pseudo range values such that each of the average pseudo range values corresponds to a best window.

In another aspect of the invention, the device for determining position includes a receiver for receiving a plurality of pseudo range measurements from a transmitting source, and a processor coupled to the receiver and configured to accept the plurality of pseudo range measurements for processing by: i) adjusting each of the plurality of pseudo range measurements for time correction and then arranging each of the plurality of pseudo range measurements in order of smallest value to largest value to form a pseudo range interval with the smallest value and the largest value as endpoints; ii) dividing the pseudo range interval into a plurality of increments having a plurality of grid points; iii) aligning a sliding pseudo range window with one of the grid points and counting the number of pseudo range measurements within the sliding pseudo range window, and then repeating for each of the other grid points within the pseudo range interval; iv) selecting a best window based on the maximal number of pseudo range measurements within the sliding pseudo range window and comparing the maximal number with an incidence threshold; and then based on the comparison, determining an average pseudo range value.

Other and further objects and advantages of the present invention will be further understood and appreciated by those skilled in the art by reference to the following specification, claims and drawings.

BRIEF DESCRIPTION OF THE DRAWINGS

FIG. 3 is an illustration of steps 245 and 250 of the flow diagram of FIG. 2.

DETAILED DESCRIPTION OF THE INVENTION

Figure 1:
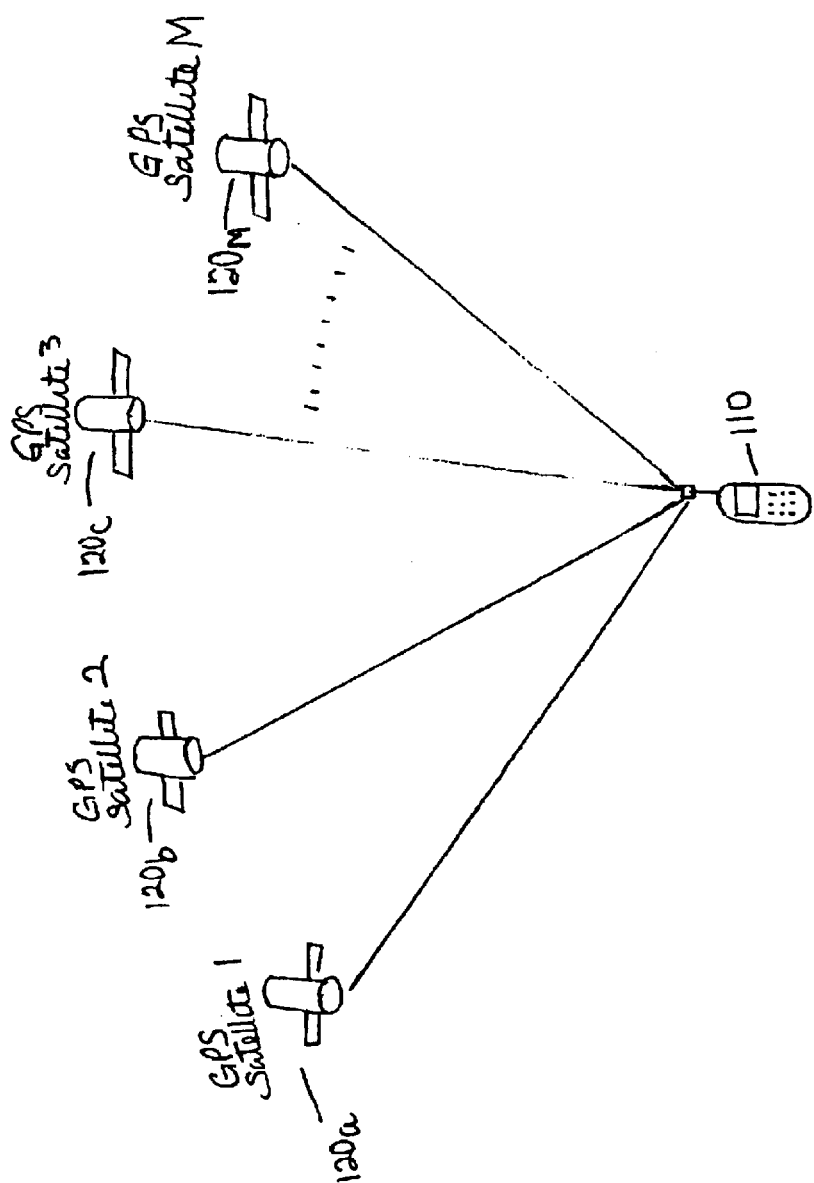
FIG. 1 illustrates a system for position determination using transmitted signals from GPS satellites.

FIG. 1 illustrates a system for position determination using transmitted signals from GPS satellites. A device 110, whose position is to be determined, receives a plurality of transmitted signals from a plurality of GPS satellites 120a–120m. The device 110 includes a receiver 112 (not shown) and a processor 116 (not shown). The implementation of the receiver 112 and the processor 116 will be known to one skilled in the art. The device 110 is any device capable of determining the arrival times of received signals with respect to a reference time. For example, the device 110 may be a mobile wireless telephone, a portable computer terminal with a wireless modem, a stand-alone GPS terminal, or any other terminal capable of receiving and processing signals from reference transmitters at known locations, such as GPS satellites, other radionavigational satellites (e.g., GLONASS, Galileo, etc.) or any other ground-based transmitters. In one embodiment, the transmitting sources are GPS satellites as shown in FIG. 1. However, in alternative embodiments, the transmitting sources could be any ground-based transmitters, or a combination of GPS satellites, other radionavigation satellites and/or ground-based transmitters.

Figure 2:
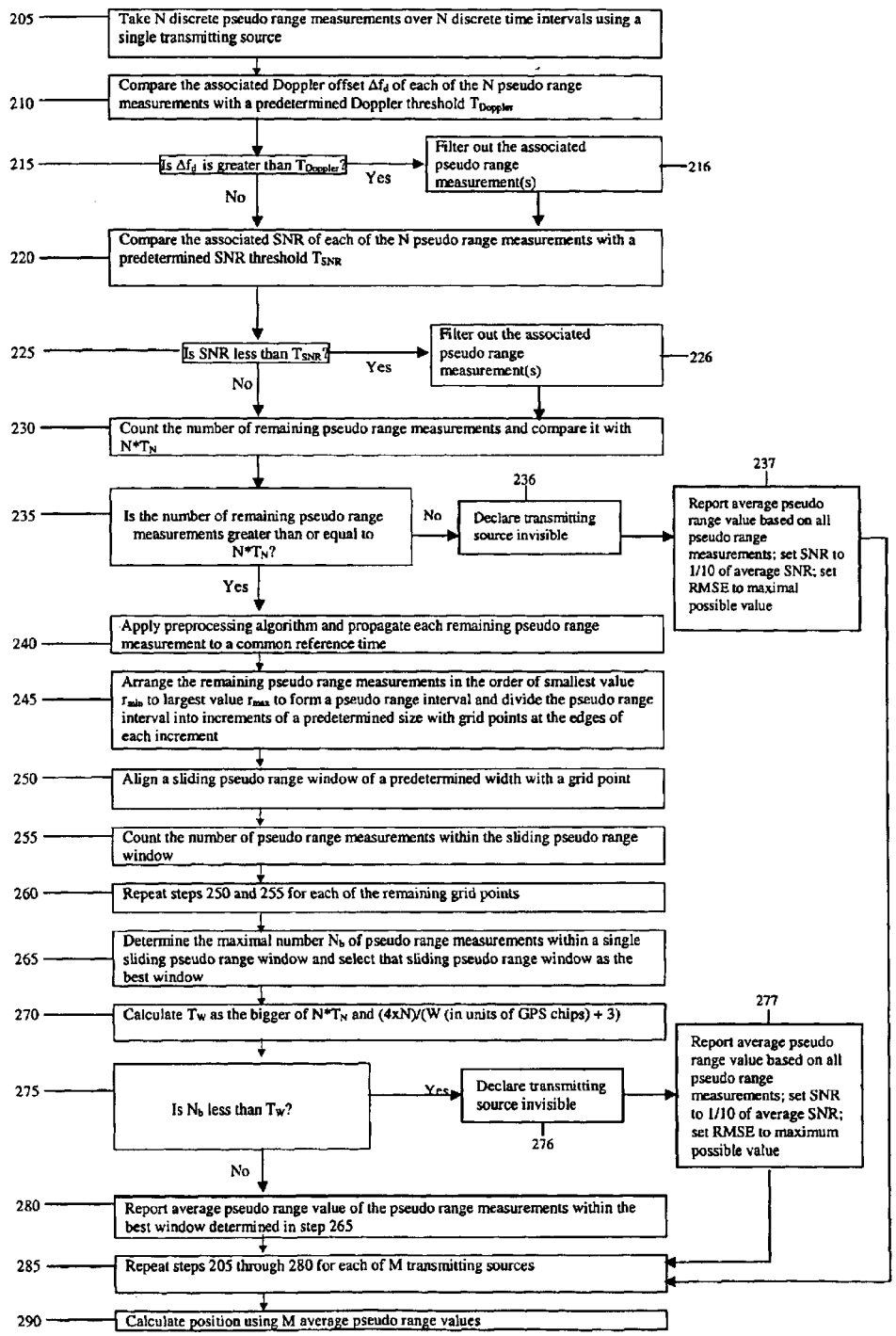
FIG. 2 is a flow diagram illustrating an algorithm for improved pseudo range estimation.

FIG. 2 is a flow diagram illustrating an algorithm for improved pseudo range estimation. This algorithm may be implemented on a conventional programmable processor. In step 205, N discrete pseudo range measurements are received from a single transmitting source, such as a GPS satellite, over N discrete time periods.

The received GPS signal frequency is typically different from the nominal GPS carrier frequency, mostly due to the high velocity of the satellites. This difference (satellite Doppler) can be as high as +/−5 kHz. The expected satellite Doppler can be computed even before any measurements are made. This Doppler prediction computation is based on an approximate user location estimate and the satellite orbital data. The predicted Doppler may be conveyed from a base station to the GPS receiver in order to help the receiver speed up searching for the satellite signal. After the search for a satellite signal is complete, the receiver determines a measured satellite Doppler. The receiver also determines the Doppler offset, $\Delta_d$, which is the difference between the measured and the predicted Doppler values. A non-zero Doppler offset may be due to any or all of the following causes:

Doppler measurement error

The actual receiver location is not the same as the location assumed when calculating the Doppler prediction The receiver's non-zero velocity in the direction of the satellite The receiver's frequency offset, in the case of a receiver employing a free running oscillator The receiver's velocity relative to the base station, in the case of a CDMA receiver, when the receiver frequency is locked on the base station frequency, which in turn is locked on GPS frequency In step 210, the Doppler offset, $\Delta f_d$, is compared with a predetermined Doppler error threshold ($T_{Doppler}$). The threshold, $T_{Doppler}$, should be chosen big enough so that the accumulated effect of the factors listed above would not exceed it.

In step 215, if $\Delta f_d$ is greater than $T_{Doppler}$ that pseudo range measurement is filtered out in step 216 before proceeding to step 220. If $\Delta f_d$ is not greater than $T_{Doppler}$ proceed to step 220.

In step 220, each of the remaining pseudo range measurements' associated SNR is compared with a predetermined SNR threshold ($T_{SNR}$). In step 225, if the measured satellite SNR is less than $T_{SNR}$, that pseudo range measurement is filtered out in step 226 before proceeding to step 230. If the measured satellite SNR is not less than $T_{SNR}$, proceed to step 230.

In step 230, the number of remaining pseudo range measurements are counted and compared with $N*T_N$, where $T_N$ is an appropriately selected filtering threshold, which can be chosen, for example, to be $T_N=\frac{1}{3}$. In step 235, if the number of remaining pseudo range measurements is less than $N*T_N$, the transmitting source (e.g., the GPS satellite) is declared invisible in step 236. When this condition occurs, the average pseudo range value will be reported, and the average pseudo range value will be marked as questionable or suspect in step 237. This latter may be achieved, for example, by setting the reported SNR value to a fraction of the average SNR, and/or by setting the reported root-mean-square error (RMSE) estimate to a multiple of the average RMSE. In a preferred embodiment, equally weighted averaging of all pseudo range measurements is used and, the SNR is set to 1/10 of the average SNR and/or the RMSE is set to the maximal possible RMSE value. The very low SNR and/or very high RMSE indicate that the pseudo range measurement is from a transmitting source that is considered invisible. The position determination algorithm uses the SNR and/or the inverse of the RMSE as weighting factors, so that transmitting source would be effectively de-weighted from the position determination. This choice permits the discrimination between cases where the device did not attempt to receive signals from a particular transmitting source and where the device did attempt signal reception, but failed to acquire good data. In another embodiment, measurements for transmitting sources that have been declared invisible by the receiver are not reported at all.

If the number of remaining pseudo range measurements is at least $N*T_N$, preprocessing will be applied to each remaining pseudo range measurement in step 240. The preprocessing incorporates adjusting each pseudo range measurement in order to propagate that measurement to a common reference time (i.e. calculate what the measurement would have been if taken at the common reference time). This measurement propagation is done by the addition of a correction term, which is proportional to the product of the predicted Doppler and the difference between the common reference time and the individual measurement time. Obviously inaccuracies in the Doppler prediction, discussed earlier, will lead to pseudo range propagation errors. In order to minimize pseudo range propagation errors, the common reference time should be chosen close to the average of the individual measurement times.

The preprocessing may also involve conventional methods of applying any or all of the following correction terms:

Ionospheric delay correction

Tropospheric delay correction

Group delay correction

Satellite clock correction

DGPS correction

In one embodiment, the preprocessing algorithm is performed by a conventional programmable processor capable of accepting raw data (i.e., pseudo range measurements) and capable of determining position of the device. Additional implementation of the preprocessing algorithm may be achieved with an ASIC, a discrete logic circuit, a state machine or a software application within another network device. The preprocessor may be located within the device or may be part of the base station.

Steps 245 and 250 are illustrated in FIG. 3. In step 245, the pseudo range measurements from a single transmitting source are arranged in the order of smallest value $r_{min}$ to largest value $r_{max}$ which define the endpoints of the pseudo range interval. This interval is divided into increments of a predetermined size and forms grid points at the edges of each predetermined increment $\Delta r$. In a preferred embodiment, with the recognition that other values may also be preferable, the increments are set at 5 meters, forming grid points at every 5 meter mark, starting from the smallest pseudo range value $r_{min}$ and ending at the largest pseudo range value $r_{max}$. If the total length of the pseudo range interval is not an integer multiple of the increment, then the endpoints of the interval may be rounded to the closest available grid points.

In step 250, a sliding pseudo range window of a predetermined width W is aligned with a grid point (e.g., the first grid point at $r_{min}$). In a preferred embodiment, the predetermined width W is set at 300 meters, although one skilled in the art would recognize that other width W values are possible. In one preferred embodiment, the sliding pseudo range window of width W is centered at the grid point, i.e., the window is placed over an interval of $\pm W/2$ from each grid point. In step 255, count the number of pseudo range values within the sliding pseudo range window. Steps 260 repeats steps 250 and 255 for each grid point.

In step 265, the sliding pseudo range window interval containing the maximal (i.e., largest) number of pseudo range measurements is selected as the 'best window'. Let $N_b$ be the number of pseudo range measurements contained in the best window determined in step 265, i.e., $N_b$ is the maximal number of pseudo ranges contained in any of the sliding pseudo range windows. In step 270, calculate an appropriate incidence threshold, $T_w$. For example, $T_w$ can be set to be the larger of the values of $N*T_N$ and 4 times N divided by the sum of 3 and the width of the sliding pseudo range window (in units of GPS chips). In step 275, compare $T_w$ calculated in step 270 to $N_b$ determined in step 265. If $N_b$ is less than $T_w$, declare the transmitting source invisible in step 276. In one embodiment, when this condition occurs, the average pseudo range value will be reported, and the average pseudo range value will be marked as questionable or suspect in step 277. This latter may be achieved, for example, by setting the reported SNR value to a fraction of the average SNR, and/or by setting the reported root-mean-square error estimate (RMSE) to a multiple of the average RMSE., In a preferred embodiment, equally weighted averaging of all pseudo range measurements is used and, the SNR is set to 1/10 of the average SNR and/or the RMSE is set to the maximal possible RMSE value. The very low SNR and/or very high RMSE indicate that the pseudo range measurement is from a transmitting source that is considered invisible. In another embodiment, measurements for transmitting sources that have been declared invisible by the receiver are not reported at all.

If $N_b$ is equal or greater than $T_w$, then in step 280, compute and report the average of the pseudo range measurements within the best window determined in step 265. In one embodiment, equally weighted averaging of the pseudo range measurements is used. Similarly, the average SNR value is determined as the average SNR associated with the measurements contained in the best window. The average RMSE may be determined as $$RMSE = 1 / \left( \sum_{i=1}^{M} RMSE_i^{-2} \right) = 1/((1/RMSE_1^2) + (1/RMSE_2^2) + \ldots + (1/RMSE_M^2))$$

where $RMSE_i$ is the root-mean-square error estimate for the $i^{th}$ pseudo range measurement.

In step 285, the procedure outlined in steps 205–280 of FIG. 2 is then repeated M times for each of the M transmitting sources. In step 290, the resulting M average pseudo range values (i.e., one average pseudo range value from each transmitting source) can then be input to a conventional position determination algorithm known to one skilled in the art. In a preferred embodiment, the transmitting sources are GPS satellites, and a conventional GPS position determination algorithm is used.

In an alternative embodiment, the pseudo range averaging algorithm may output more than one average pseudo range values for any of the M transmitting sources. This may be advantageous because of the possible existence of signal repeaters in the case where the transmitting sources are terrestrial base stations, or because of the existence of multipath signal propagation. Further processing, which is well-known in the art, is then used to determine which average pseudo range value corresponds to a base station and which average pseudo range value corresponds to a repeater, or alternatively, which average pseudo range value corresponds to the earliest path amongst the possible multipath average pseudo range values. Note that the input to the pseudo range averaging algorithm may also contain multiple pseudo range values (i.e., both detected base station and repeater signals, or a multitude of detected multipath signals) for any single measurement time.

In yet another embodiment, for each transmitting source, multiple best windows are selected based on predetermined criteria known to one skilled in the art, with each best window having an associated weight. In one embodiment, the weight is the sum of the associated SNR values of the pseudo range measurements within the sliding pseudo range window. For each transmitting source i, denote $N_i$ as the number of selected best windows. For all M transmitting sources, determine the total combination of best windowswhereis the product of all $N_i$ for all M transmitting sources, e.g., denoted by the following equation:

$$N_h = \prod_{i=1}^{M} N_i = N_1 \times N_2 \times N_3 \times \ldots \times N_M$$

The position determination algorithm is executed for all $N_h$ combinations of best windows from all M transmitting sources. The position fix is selected from all $N_h$ combinations of possible positions based on the maximal input weight, optimal performance (e.g., smallest expected error) or both.

The advantages of the improved pseudo range estimation algorithm of the present invention include: reduced measurement error (as shown in FIGS. 4–9) due to improved outlier removal; improved dilution of precision (DOP) from increased average transmitting source visibility due to the combining of several measurements; and more effective measurement integrity monitoring by comparing multiple pseudo range measurements from the same transmitting source.

Figure 4:
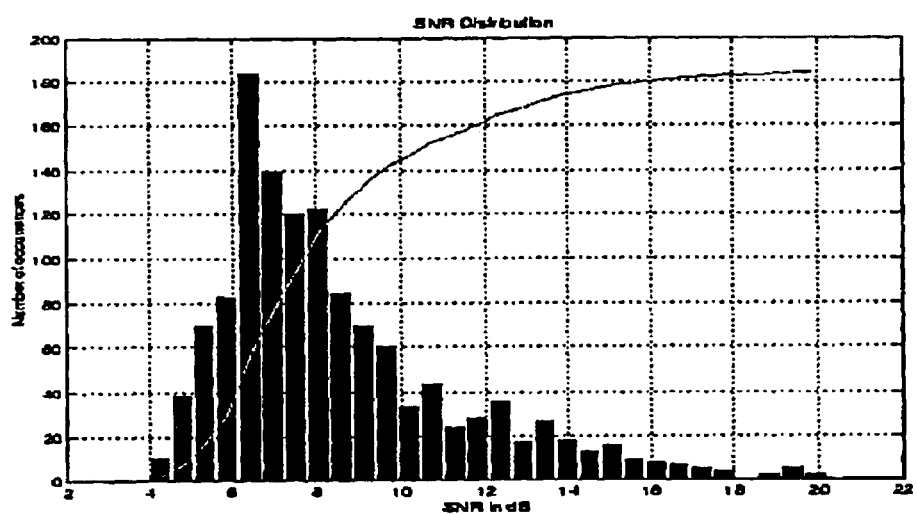
FIG. 4 is a typical SNR distribution of the satellite measurements.

FIG. 4 is a SNR distribution of GPS satellite measurements under severe signal blockage condition (measurements taken inside a multi-story concrete building). As shown, the number of occurrences is tallied against the SNR measured in dB. Typically, pseudo range measurements corresponding to SNR values of less than 11 dB are omitted from the position calculation. The integral (cumulative) distribution of the number of occurrences is superimposed onto the SNR histogram plot.

Figure 5:
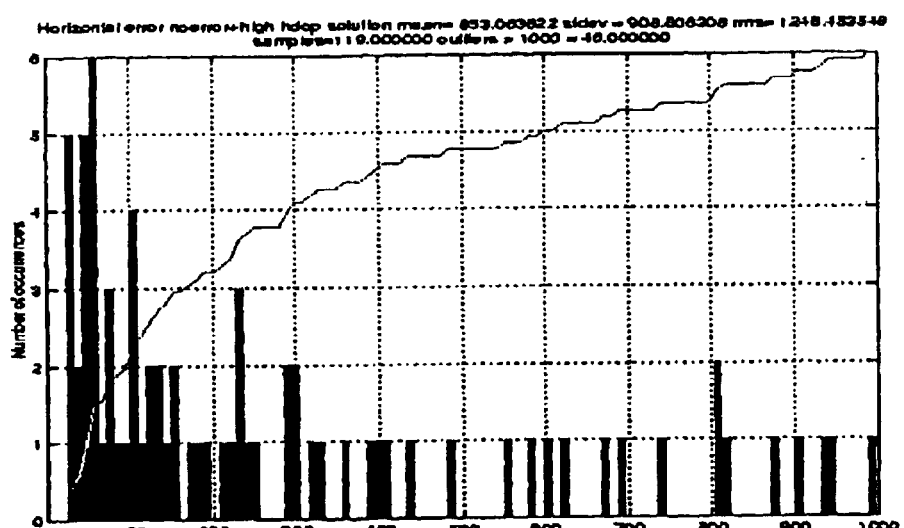
FIG. 5 is an error distribution using a single point position measurement result.

FIGS. 5–9 are summary plots of actual test data acquired from a GPS terminal. FIG. 5 is an error distribution using a single point position measurement result. As shown, number of occurrences is tallied against the horizontal position error measured in meters. The integral distribution of the number of occurrences is superimposed onto the error histogram graph.

Figure 6:
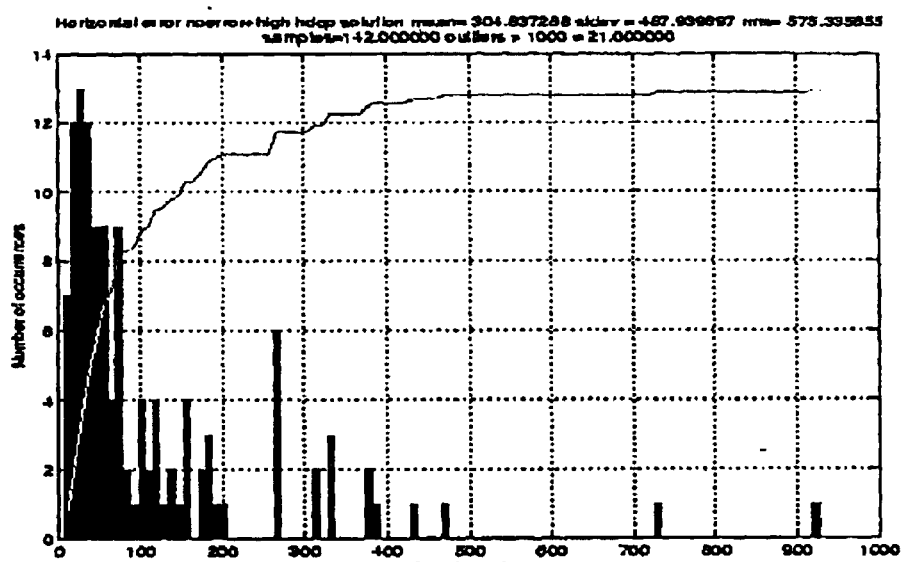
FIG. 6 is an error distribution using five point position averaging.

FIG. 6 is an error distribution using five-point position averaging. The position averaging also involved outlier removal in the computed position domain. As shown, the number of occurrences is tallied against the horizontal position error measured in meters. The integral curve of the number of occurrences is superimposed onto the error histogram graph. As expected from using an increased quantity of position points, a reduction of error results by using five point position measurements over single point position measurements.

Figure 8:
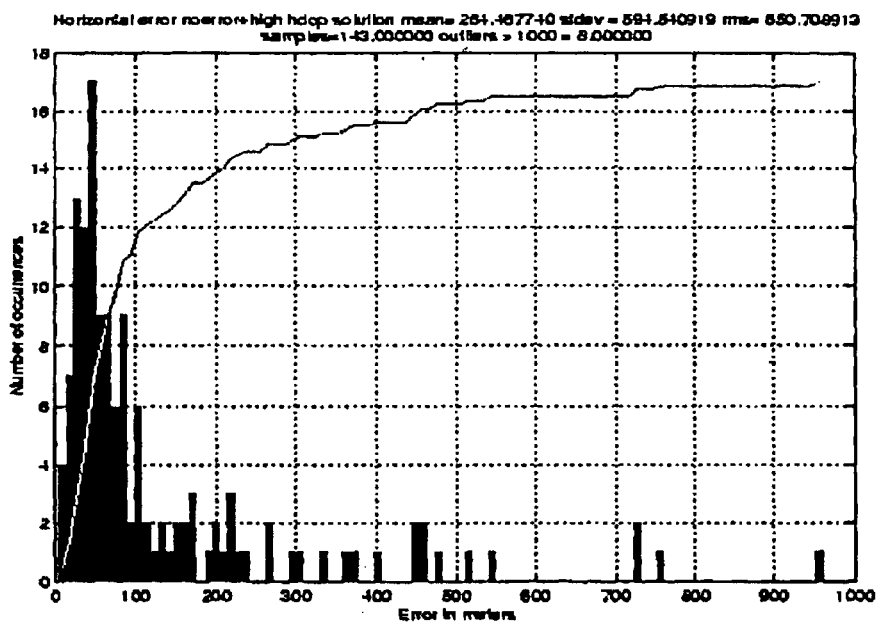
FIG. 8 is an error distribution using five point pseudo range averaging.

FIG. 8 is an error distribution using five-point pseudo range averaging. As shown, the number of occurrences is tallied against the horizontal position error measured in meters. The integral distribution of the number of occurrences is superimposed onto the error distribution graph. In comparing FIG. 8 with FIG. 6, a significant decrease in outliers greater than 1000 meters is indicated. There were approximately 21 residual outliers with five-point position averaging compared to 8 residual outliers when five-point pseudo range averaging was used.

Figure 7:
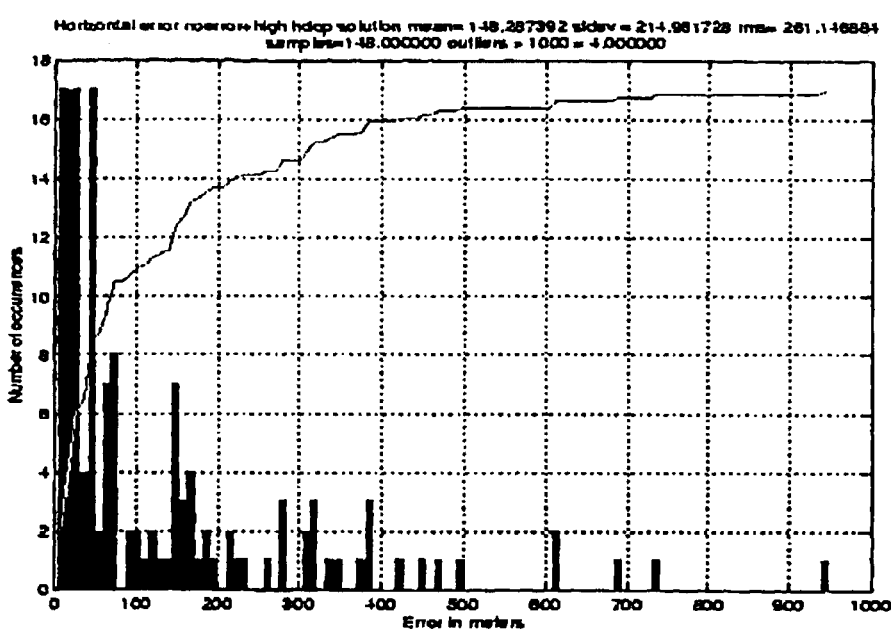
FIG. 7 is an error distribution using ten point position averaging.

FIG. 7 is an error distribution using ten-point position averaging. The position averaging also involved outlier removal in the computed position domain. As shown, the number of occurrences is tallied against the horizontal position error measured in meters. The integral distribution of the number of occurrences is superimposed onto the error distribution graph. As expected from using an increased quantity of position points, a reduction of error results by using ten-point position measurements over single point and five-point position measurements.

Figure 9:
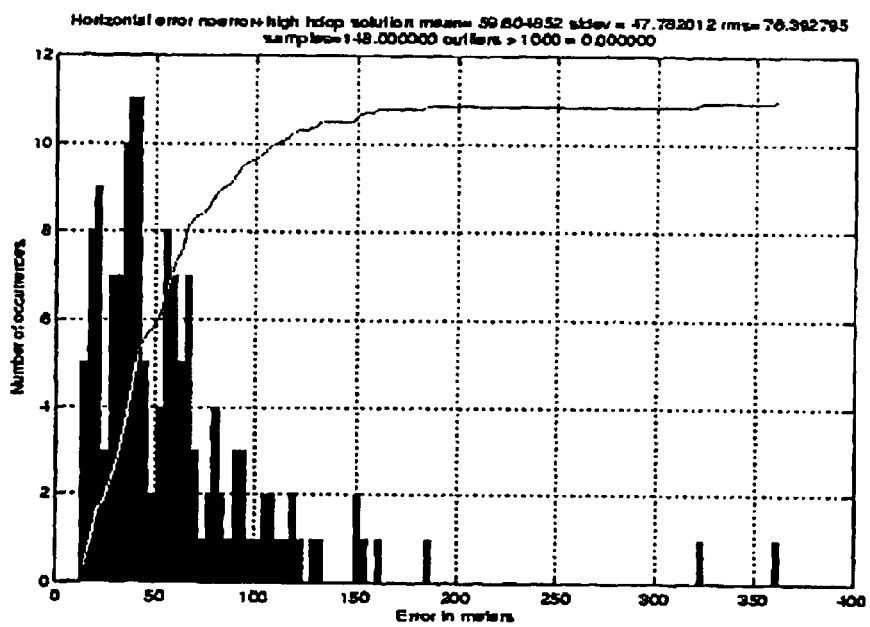
FIG. 9 is an error distribution using ten point pseudo range averaging.

FIG. 9 is an error distribution using ten-point pseudo range averaging. As shown, the number of occurrences is tallied against the horizontal position error measured in meters. The integral curve of the number of occurrences is superimposed onto the error distribution graph. In comparing FIG. 9 with FIG. 7, a significant decrease in outliers greater than 1000 meters is indicated. There were approximately 4 residual outliers with ten-point position averaging compared to 0 residual outliers when ten-point pseudo range averaging was used.

While the present invention has been described in terms of the preferred embodiments, other variations which are within the scope of the invention as defined in the claims will be apparent to those skilled in the art.

What is claimed is:

1. A method for determining a position of a device, comprising:

receiving a plurality of pseudo range measurements from a transmitting source;

adjusting each of the plurality of pseudo range measurements for time correction and then arranging each of the plurality of pseudo range measurements in order of smallest value to largest value to form a pseudo range interval with the smallest value and the largest value as endpoints;

dividing the pseudo range window into a plurality of increments having a plurality of grid points;

aligning a sliding pseudo range window having a width over the pseudo range interval at a first of the plurality of grid points and counting the number of pseudo range measurements within the sliding pseudo range window, and them repeating for each of the plurality of grid points within the pseudo range interval;

selecting a best window based on a maximal number of pseudo range measurements within the sliding pseudo range window; comparing the maximal number with an incidence threshold; and then based on the comparison, determining an average pseudo range value;

wherein the sliding pseudo range window width is 300 meters.

2. A method for determining a position of a device, comprising:

receiving a plurality of pseudo range measurements from a transmitting source;

adjusting each of the plurality of pseudo range measurements for time correction and then arranging each of the plurality of pseudo range measurement in order of smallest value to largest value to form a pseudo range interval with the smallest value and the largest value as endpoints;

dividing the pseudo range interval into a plurality of increments having a plurality of grid points;

aligning a sliding pseudo range window having a width over the pseudo range interval at a first the plurality of grid points and counting the number of pseudo range measurements within the sliding pseudo range window, and then repeating for each of the plurality of grid points within the pseudo range interval;

selecting a best window based on a maximal number of pseudo range measurements within the sliding pseudo range window; comparing the maximal number with an incidence threshold; and then based on the comparison, determining an average pseudo range value;

wherein the value of each of the plurality of increments is 5 meters.

3. A method for determining a position of a device, comprising:

receiving a plurality of pseudo range measurements from a transmission, source;

adjusting each of the plurality of pseudo range measurements for time correction and then arranging each of the plurality of pseudo range measurements in order of smallest value to largest value to form a pseudo range interval with the smallest value and the largest value as endpoints;

dividing the pseudo range interval into a plurality of increments having a plurality of grid points;

aligning a sliding pseudo range window having a width over the pseudo mage interval at a first of the plurality of grid points and counting the number of pseudo range measurements within the sliding pseudo range window, and then repeating for each of the plurality of grid points within the pseudo range interval;

selecting a best window based on a maximal number of pseudo range measurements within the sliding pseudo range window; comprising the maximal number with an incidence threshold; and then based on the comparison, determining an average pseudo range value;

wherein the quantity of the plurality of pseudo range measurements equaling N, and wherein the incidence threshold is the larger of: a filtering threshold times N, or 4 times N divided by the sum of 3 and the sliding pseudo range window width in units of GPS chips.

4. The method of claim 3 wherein the value of the filtering threshold is 1/3.

5. The method of claim 3 wherein the maximal number is less than the incidence threshold, and the average pseudo range value is an average of the plurality of pseudo range measurements.

6. The method of claim 5 wherein the average of the plurality of pseudo range measurements is equally weighted.

7. The method of claim 6 comprising the step of determining an average SNR corresponding to the average pseudo range value.

8. The method of claim 7, wherein the average SNR is multiplied by a fraction.

9. The method of claim 8 wherein the fraction is one-tenth.

10. The method of claim 5 further combine the step of determining an average RMSE corresponding to the average pseudo range value.

11. The method of claim 10 wherein the average RMSE is multiplied by a multiple value.

12. The method of claim 3 wherein the maximal number is equal or greater than incidence threshold, and the average pseudo range value is an average of the pseudo range measurements within the best window.

13. The method of claim 12 wherein the average of the pseudo range measurements within the best window is equally weighted.

14. The method of claim 12 further comprising the step of determining an average SNR co ding to the average pseudo range value.

15. The method of claim 12 further comprising the step of determining an average RMSE corresponding to the average pseudo range value.

16. A method for determining a position of a device, comprising:

receiving a plurality of pseudo range measurements from a transmitting source;

adjusting each of the plurality of pseudo range measurements in order of smallest value then arranging each of the plurality of pseudo range measurements in order of smallest value to largest value to form a pseudo range interval with the smallest value and the largest value as endpoints;

dividing the pseudo range interval into a plurality of increments having a plurality of grid points;

aligning sliding pseudo range window having a width over the pseudo range interval at a first of the plurality of grid points and counting the number of pseudo range measurements within the sliding pseudo range window, and then repeating for each of the plurality of grid points within the pseudo range interval;

selecting a best window based on a maximal number of pseudo range measurements within the sliding pseudo range window; comparing the maximal number with an incidence threshold; and then based on the comparison, determining an average pseudo range value;

wherein each of the plurality of pseudo range measurements having an associated Doppler offset and further comprising the step of comparing the associated Doppler offset with a Doppler threshold.

17. A method for determining a position of a device, comprising:

receiving a plurality of pseudo range measurements form a transmitting source;

adjusting each of the plurality of pseudo range measurements for time correction and then arranging each of the plurality of pseudo range measurements in order of smallest value to largest value to form a pseudo range interval with the smallest value and the largest value as endpoints;

dividing the pseudo range interval into a plurality of increments having a plurality of grid points;

aligning a sliding pseudo range window having a width over the pseudo range interval at a first of the plurality of grid points and counting the number of pseudo range measurements within the sliding pseudo range window, and then repeating for each of the plurality of grid points within the pseudo range interval;

selecting a best window based on a maximal number of pseudo range measurements within the sliding pseudo range window; comparing the maximal number with an incidence threshold; and then based on the comparison, determining an average pseudo range value;

repeating the steps of claim 1 M−1 (i.e., M minus one) times for each of remaining M−1 transmitting sources to determine a plurality of M average pseudo range values.

18. The method of claim 17 further comprising the step of determining the position of the device based on the plurality of M average pseudo range values.

19. A method for determining a position of a device, comprising:

receiving a plurality of pseudo range measurements from a transmitting source;

adjusting each of the plurality of pseudo range measurements for time correction and then arranging each of the plurality of pseudo range measurements in order of smallest value to largest value to form a pseudo range interval with the smallest value and the largest value as endpoints;

dividing the pseudo range interval into a plurality of increments having a plurality of grid points;

aligning a sliding pseudo range window having a width over the pseudo range interval at a first of the plurality of grid points and counting the number of pseudo range measurements within the sliding pseudo range window, and then repeating for each of the plurality of grid points within the pseudo range interval;

selecting a plurality of best windows based on at least one predetermined criteria and determining a plurality of average pseudo range values wherein each or the plurality of average pseudo range values corresponding to each of the plurality of best windows.

20. The method of claim 19 further comprising the step of determining a plurality of average signal-to-noise ratios (SNRs) wherein each of the plurality of average SNRs corresponding to each of Phe plurality of average pseudo range values.

21. The method of claim 19 further comprising the step of determining a plurality of average RMSEs wherein each of the plurality of average RMSEs corresponding to each of the plurality of average pseudo range values.

22. The method of claim 19 further comprising repeating the steps of claim 25 M−1 (i.e., M minus one) times for each of remaining M−1 transmitting sources.

23. The method of claim 22 further comprising the step of determining the position of the device based on a combination of the plurality of best windows.

24. A device for determining position, comprising:

a receiver for receiving a plurality of pseudo range measurements from a transmitting source;

a processor coupled to the receiver and configured to accept the plurality of pseudo range measurements for processing by:

i) adjusting each of the plurality of pseudo range measurements for time correction and then arranging each of the plurality of pseudo range measurements in order of smallest value to largest value to form a pseudo range interval with the smallest value and the largest value as endpoints;

ii) dividing the pseudo range interval into a plurality of increments having a plurality of grid points;

iii) aligning a sliding pseudo range window having a width ova the pseudo range interval at a first of the plurality of grid points and counting the number of pseudo range measurements within the sliding pseudo range window, and then repeating for each of the plurality of grid points within the pseudo range interval;

iv) selecting a best window based on a maximal number of pseudo range measurements within the sliding pseudo range window and comparing the maximal number with an incidence threshold; and then based on the comparison, determining an average pseudo range value.

25. A device for determining a position, comprising:

a receiver for receiving a plurality of pseudo range measurements from a transmitting source;

a processor coupled to the receiver and configured to accept the plurality of pseudo range measurements for processing by:

i) adjusting each of the plurality of pseudo range measurements for time correction and then arranging each of the plurality of pseudo range measurements in order of smallest value to largest value to form a pseudo range interval with the smallest value and the largest value as endpoints;

ii) dividing the pseudo range interval into a plurality of increments having a plurality of grid points;

iii) aligning a sliding pseudo range window having a width over the pseudo range interval at a first of the plurality of grid points and counting the number of pseudo range measurements within the sliding pseudo range window, and then repeating for each of the plurality of grid points within the pseudo range interval;

iv) selecting a plurality of best windows based on at least one predetermined criterion and determining a plurality of average pseudo range values wherein each of the plurality of average pseudo range values corresponding to each of the plurality of best windows.

26. A device for determining position, comprising:

means for receiving a plurality of pseudo range measurements from a transmitting source;

means for adjusting each of the plurality of pseudo range measurements for time correction and then arranging each of the plurality of pseudo range measurements in order of smallest value to largest value to form a pseudo range interval with the smallest value and the largest value as endpoints;

means for dividing the pseudo range interval into a plurality of increments having a plurality of grid points;

means for aligning a sliding pseudo range window having a width over the pseudo range interval at a first of the plurality of grid points and counting the number of pseudo range measurements within the sliding pseudo range window, and then repeating for each of the plurality of grid points within the pseudo range interval;

means for selecting a best window based on a maximal number of pseudo range measurements within the sliding pseudo range window and comparing the maximal number with an incidence threshold; and then based on the comparison, determining an average pseudo range value.

27. A method for determining a position of a device, comprising:
- means for receiving a plurality of pseudo range measurements from a transmitting source;
- means for adjusting each of the plurality of pseudo range measurements for time correction and then arranging each of the plurality of pseudo range measurements in order of smallest value to largest value to form a pseudo range interval with the smallest value and the largest value as endpoints;
- means for dividing the pseudo range interval into a plurality of increments having a plurality of grid points;
- means for aligning a sliding pseudo range window having a width over the pseudo range interval at a first of the plurality of grid points and counting the number of pseudo range measurements within the sliding pseudo range window, and then repeating for each of the plurality of grid points within the pseudo range interval;
- means for selecting a plurality of best windows based on at least one predetermined criterion and determining a plurality of average pseudo range values wherein each of the plurality of average pseudo range values corresponding to each of the plurality of best windows.

28. Computer readable media embodying a program of instructions executable by a computer program to perform a method for determining a position of a device, the method comprising:
- receiving a plurality of pseudo range measurements from a transmitting source;
- adjusting each of the plurality of pseudo range measurements for time correction and then arranging each of the plurality of pseudo range measurements in order of smallest value to largest value to form a pseudo range interval with the smallest value and the largest value as endpoints;
- dividing the pseudo range interval into a plurality of increments having a plurality of grid points;
- aligning a sliding pseudo range window having a width over the pseudo range interval at a first of the plurality of grid points and counting the number of pseudo range measurements within the sliding pseudo range window, and then repeating for each of the plurality of grid points within the pseudo range interval;
- selecting a plurality of best windows based on at least one predetermined criterion and determining a plurality of average pseudo range values wherein each of the plurality of average pseudo range values corresponding to each of the plurality of best windows.

* * * * *